(12) United States Patent
Lawrence

(10) Patent No.: US 6,817,345 B2
(45) Date of Patent: Nov. 16, 2004

(54) CARBON IMPREGNATION OF POROUS DUCTING FOR EVAPORATIVE EMISSIONS ABSORPTION

(75) Inventor: Donald McAlpine Lawrence, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 10/248,121

(22) Filed: Dec. 19, 2002

(65) Prior Publication Data

US 2004/0118387 A1 Jun. 24, 2004

(51) Int. Cl.[7] ............................................. F02M 33/02
(52) U.S. Cl. ................................................. 123/518
(58) Field of Search ........................... 123/518, 516, 123/515, 198 D; 701/104

(56) References Cited

U.S. PATENT DOCUMENTS 4,279,630 A * 7/1981 Nakamura et al. ............ 96/138
6,438,486 B1 * 8/2002 Mancini ...................... 701/104

OTHER PUBLICATIONS

Westaflex Automobile, "Acoustic Ducts", product description brochure.

Mann + Hummel, "Air Filter Systems", product description brochure.

* cited by examiner

Primary Examiner—Mahmoud Gimie
(74) Attorney, Agent, or Firm—Brooks Kushman P.C.; Damian Porcari

(57) ABSTRACT

The present invention discloses a hydrocarbon-removing component for the air intake system of an internal combustion engine which removes hydrocarbons escaping a vehicle when the engine is not in use. The hydrocarbon-removing component of the present invention includes a duct with a hydrocarbon-removing material incorporated in an inner surface. The preferred hydrocarbon-removing material include activated carbon and zeolites.

40 Claims, 1 Drawing Sheet

CARBON IMPREGNATION OF POROUS DUCTING FOR EVAPORATIVE EMISSIONS ABSORPTION

BACKGROUND OF INVENTION

1. Field of the Invention

The present invention is related to vehicle air intake components and, more particularly, to air intake components that remove hydrocarbons from an air intake system when the vehicle engine is not in operation.

2. Background Art

Evaporative emission regulations that vehicles require the control of polluting substances (primarily hydrocarbons) from the vehicle as it sits unused. These emissions are leaked out of the vehicle from many sources including the air intake system. In the past, only those from the fuel tank were captured, with carbon-filled canisters, but this has now been expanded to the entire vehicle. Newer regulations require control of emission of harmful substances from the air inlet system of the powertrain when the vehicle is at rest (not in use). These substances need to be retained within the air inlet system until the powertrain is again used when the retention system will give up the harmful substances to be consumed and controlled through the normal exhaust emission control systems.

There are several ways to control the outward flow of pollutants from the air intake system of an automobile. One such technique is the careful shaping of the ducting and filter box. However, this method is often not sufficient to meet the regulatory requirements. Accordingly, other methods must be used such as the incorporation of systems in the air intake system that use some form of carbon or other material to absorb the pollutants during the rest cycle. When the vehicle is next started, the in-rushing air will draw the pollutants from the absorbent and deal with them through the normal exhaust system pollution controls. This inward air rush also regenerates the absorption systems so that they may be reused. Unfortunately, these extra absorption systems add cost, weight and complexity to a vehicle and often restrict the air flow.

Many vehicles, especially with smaller engines, use an air intake system for the powertrain which uses in part a porous material for noise attenuation. Most often, this is on the "dirty" side before the air reaches the air intake filter. Sometimes the porous material is used after the filter with a wrapping to keep dirty air from being drawn in through the pours from outside. However, such noise attenuation does not remove pollutants from a vehicle air intake system to any significant degree.

For the reasons set forth above, there is a need for an improved air intake system that removes pollutants when a vehicle is not in use that does not significantly add cost, weight or complexity to the vehicle design.

SUMMARY OF INVENTION

The present invention overcomes the problems encountered in the prior art by providing a hydrocarbon-removing component for a vehicle air intake system of an internal combustion engine that comprises a duct having an inner surface and a cross-section and a hydrocarbon-removing material incorporated into the inner surface of the duct. The cross-section is of sufficient size to allow air to flow into the internal combustion engine during operation. Accordingly, the component of the present invention removes hydrocarbons when exposed to the air in the vehicle air intake system when the internal combustion engine is not in use.

The hydrocarbon-removing component of the present invention is advantageously integrating the hydrocarbon-removing material into an existing air intake component. Such components include the air inlet, the air filter, the resonator, and the clean air tube. For example, if a vehicle uses a porous duct for the control of noise, whether before or after the air filter, the porous duct can be coated or impregnated with carbon or similar material to absorb pollutants. This takes advantage of the great surface area of the porous ducting to increase the absorption capabilities of the duct. Thus a preexisting part with slight and inexpensive modifications can be made to serve two functions and eliminate the need for the addition of a separate absorption device. Alternatively, if the vehicle still requires an absorption device to meet emission regulations, by coating or impregnating the porous duct with carbon or other absorption materials, the absorption device can be made smaller, less expensive and less restrictive by the inexpensive addition of an absorbing material to a device which is already in place for noise attenuation. If the porous duct is on the "dirty" inlet side, it can be encased in a solid wall duct or sleeve to keep the pollutants from escaping through the duct walls into the environment. The porous material is typically made from a natural or synthetic fiber which is woven, spun or otherwise formed into the duct.

In another embodiment of the present invention, a method of forming the hydrocarbon-removing component of the present invention is provided. This method comprises adhering a hydrocarbon-removing material to the inner surface of a section of an air intake component with an adhesive capable of withstanding temperatures from −40 to 300 degrees F.

In yet another embodiment of the present invention, a second method of forming the hydrocarbon-removing component of the present invention is provided. This second method comprises combining fibers, a hydrocarbon-removing material, and a binder together to form a premix. The premix is then pressed together to form a sheet which is cut into a pattern that can be formed into a duct.

DETAILED DESCRIPTION

Figure 1:
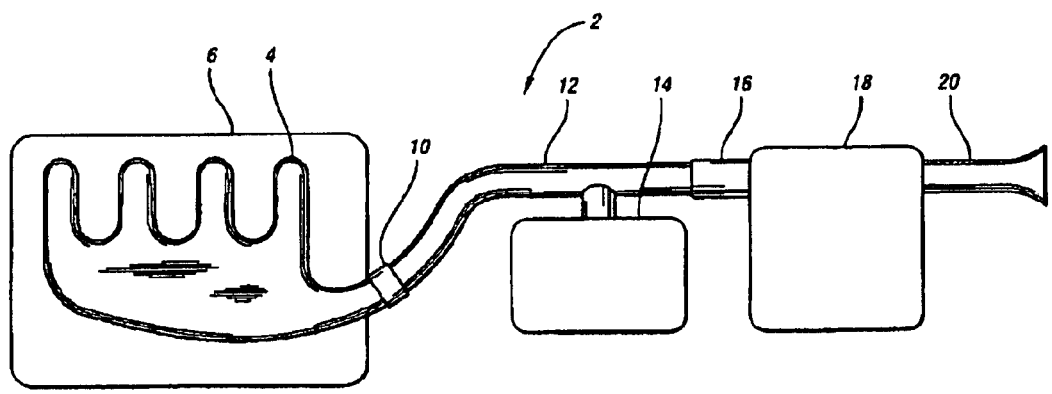
FIG. 1 is a schematic of an air intake system illustrating sections that may incorporate the air intake component of the present invention.

Reference will now be made in detail to presently preferred compositions or embodiments and methods of the invention, which constitute the best modes of practicing the invention presently known to the inventors.

In an embodiment of the present invention, a hydrocarbon-removing component for a vehicle air intake system of an internal combustion engine is provided. The hydrocarbon-removing component comprises a duct having an inner surface and a cross-section, and a hydrocarbon-removing material. The cross-section is of sufficient size to allow air to flow into the internal combustion engine during operation. In a typical application of the present invention, the duct is a flexible tube with a generally circular cross-section of 2 to 6 inch diameter. The duct will also have another surface which does not come into direct contact with the air drawn into a vehicle intake system. Furthermore, the hydrocarbon-removing material is incorporated into the inner surface of the duct by either being impregnated into the duct or adhered to the inner surface. Accordingly, when the hydrocarbon-removing component of the present invention is used in an air intake system, hydrocarbons are removed from the air intake when the vehicle is not in operation. The secondary purpose is to absorb noise created in the intake process.

Though not limiting the present invention to any particular mechanism of operation, the hydrocarbon-removing material removes the hydrocarbons in the vehicle air intake system by adsorption, absorption, or by a combination of adsorption and absorption. Furthermore, the hydrocarbon-removing material must be able to withstand the standard under-hood automotive environment. For example, this material must be able to tolerate temperature ranges of −40 to +300 degrees F.; it must be resistant to water, coolant, oil, gasoline, diesel fuel, brake fluid, salt, and any other common automobile substances. Also the materials must withstand all vibration and air flow stresses that a given powertrain might demand. Preferred hydrocarbon-removing materials include activated carbon, zeolites, or mixtures thereof. Activated carbon or charcoal is an amorphous form of carbon that is characterized by having a porous internal microstructure having an extremely high surface area. Charcoal becomes activated by heating it with steam in the absence of oxygen. Activated carbon tends to have large pores. Zeolites, on the other hand, contain very small internal pores, in all cases from 3 to 5 angstroms. For this reason, zeolite is a highly selective adsorbent of specific gas-phase molecules and elements. Many of the identified indoor air pollutants, including formaldehyde, chloroform, ammonia and carbon monoxide, are in a size range that is most effectively sieved by zeolite.

The term "duct" are used herein refers to any section of a vehicle air intake section that air may flow into. Such sections include the air inlet, the air filter, the resonator, and the clean air tube. In a particularly preferred embodiment, the duct will be corrugated. The duct used in the present invention may be made of any material that can withstand under the hood environment. Furthermore, to maximize the carbon holding capacity and the sound adsorption capacity, the duct should have as much surface area as possible. This includes not only folds or other features to increase surface area but also pores, crevices, loops, cilia, etc., that are part of the material from which the duct is made. The actual material used would be based on a combination of sound-absorbing ability, carbon-holding capacity, and manufacturing and cost considerations. While there are numerous materials which can meet these criteria, a woven or matted nylon or polyester strip wound into a tube or other shape seems most appropriate and cost effective. Suitable materials of construction include plastic, paper, or cardboard. More preferably, the duct is formed from a thermoplastic polymer. Suitable thermoplastic polymers include polyolefin-based polymers, polystyrene-based polymers, polycabonate polymers, or mixture thereof. Most preferably, the duct is made from polyethylene, polypropylene, polyester, or nylon.

With reference to FIG. 1, a schematic of a vehicle air intake system is provided. Air intake system 2 comprises intake manifold 4 attached to engine 6. Intake manifold 4 is connected to throttle body 10 which, in turn, is connected to clean air tube 12. Resonator 14 connects to clean air tube 12 and is used to attenuate engine sound. Clean air tube 12 also connects to mass air meter 16 which is located downstream (as measure from the outside to the inside) from air filter 18. Air inlet 20 is located, in turn, further upstream from air filter 18. During normal engine operation, air is drawn into air intake 20 and then into air filter 18 where particles and other contaminants are removed. The clean air then flows through mass air meter 16 through clean air tube 12 and then into the engine 6 through intake manifold 4. The hydrocarbon-removing component of the present invention is advantageously integrated into any part of the air intake system as described in more detail below. For example, the hydrocarbon-removing component may be part of clean air tube 12, resonator 14, air filter 18, or air intake 20.

The hydrocarbon-removing component of the present invention is made by several techniques know to those in the art of duct making. For example, the hydrocarbon material may be vibrated or rubbed into the weave of a duct made of a woven material. In one preferred method, a hydrocarbon-removing material is adhered to the inner surface of a duct. The duct is preferably made of materials as set forth above. Suitable ducts are those which may also be simultaneously used to attenuate sound from the automobile engine. Such ducts include, but are not limited to, the Sonoflex Line of ducts commercially available from Westaflex Brasil or from West Akron North America located in Akron, Ohio. Alternatively, the duct may be any other duct used in the air intake system such as the Termoflex and Flex lines of ducts also available from Westaflex Brasil or West Akron North American. As set forth above, the cross-section is of sufficient size to allow air to flow into the internal combustion engine during operation. Typically, such ducting will have a cross-section from about 2 inches to about 6 inches. Accordingly, when the hydrocarbon-removing component of the present invention is used in an air intake system, hydrocarbons are removed from the air intake when the vehicle is not in operation. The hydrocarbon-removing material is adhered to the inner-surface of the duct by applying an adhesive to the inner surface of the duct to form a coated inner surface and then applying the hydrocarbon-removing material to the coated inner surface. The adhesive used must be sufficiently chemically resistant so that it does not degrade when exposed to the engine environment. Furthermore, the adhesive must be able to withstand temperatures from −40 to 300 degrees F. Suitable adhesives include, but are not limited to, PVC thermosetting adhesives such as Microset-30 commercially available from Navtara Organics Limited. The preferred hydrocarbon-removing material is activated carbon or a zeolite as set forth above.

In another embodiment of the present invention, the hydrocarbon-removing component of the present invention is made by combining fibers, a hydrocarbon-removing material, and a binder together to form a premix. The premix is then pressed together to form a sheet. The sheet is then cut into a pattern that may be rolled into a duct. Curing of the premix is optionally accelerated by heating. Preferred fibers include plastic, paper or cardboard fibers. More preferably, the fibers are thermoplastic polymer fibers. Suitable thermoplastic polymer fibers include polyolefin-based fibers, polystyrene-based fibers, polycabonate fibers, or mixture thereof. Most preferably, the fibers are polyethylene fibers, polypropylene fibers, polyester fibers, or nylon fibers. The binder is also selected from material that can withstand the automobile under the hood environment. Suitable binders include polyvinyl acetate, polyvinyl chloride homopolymers, polyvinyl chloride-polyvinyl acetate copolymers, vinyl chloride propylene copolymer, polyvinyl chloride-acrylic copolymers, and mixtures thereof. The preferred hydrocarbon-removing material is the same as set forth above.

In yet another embodiment of the present invention, the component of the present invention is made by lining the interior of a duct or other component of the air intake system with a sheet impregnated with the hydrocarbon-removing material. Alternatively, the sheet is first formed into a tube which can be slipped into an air intake component. Preferably, such sheet will be foamed to provide a high surface area. Suitable foamed sheets are available include the Nanosorb™ Adsorptive filter commercially available from Mann & Hummel. The sheet is either attached or adhered to the inner surface of a duct or any other component in the air intake system. Again, the adhesive used must be sufficiently chemically resistant so that it does not degrade when exposed to the engine environment and must be able to withstand temperatures from −40 to 300 degrees F. Suitable adhesives include, but are not limited to, PVC thermosetting adhesives such as Microset-30 commercially available from Navtara Organics Limited. Alternatively, the sheet is attached by a physical mechanism such as bolting or stapling.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hydrocarbon-removing component for a vehicle air intake system of an internal combustion engine, the component comprising:
   a duct having an inner surface and a cross-section, the cross-section being of sufficient size to allow air to flow into the internal combustion engine during operation, wherein the duct is part of an air filter; and
   a hydrocarbon-removing material;
   wherein the hydrocarbon-removing material is incorporated into the inner surface of the duct and removes hydrocarbons when exposed to the air in the vehicle air intake system when the internal combustion engine is not in use.

2. The component of claim 1 wherein the hydrocarbon-removing material removes the hydrocarbons in the vehicle air intake system by adsorption, absorption, or by a combination of adsorption and absorption.

3. The component of claim 1 wherein the hydrocarbon-removing material is activated carbon or a zeolite.

4. The component of claim 1 wherein the cross-section is essentially circular with a diameter of 2 to 6 inches.

5. The component of claim 1 wherein the hydrocarbon-removing material is affixed to the inner surface of the duct with an adhesive.

6. The component of claim 1 wherein the hydrocarbon-absorbing material is affixed to the inner surface of the duct with an adhesive.

7. The component of claim 1 wherein the hydrocarbon-removing material is combined with plastic fibers and a binder to form the duct.

8. The component of claim 1 wherein the hydrocarbon-absorbing material is combined with plastic fibers and a binder that are used to form the duct.

9. The component of claim 1 wherein the duct is formed from plastic, paper or cardboard.

10. The air intake component of claim 1 wherein the duct formed from a thermoplastic polymer.

11. The air intake component of claim 1 wherein the thermoplastic polymer is a polyolefin-based polymer, a polystyrene-based polymer, a polycabonate polymer, or mixture thereof.

12. The air intake component of claim 1 wherein the duct is made from polyethylene, polypropylene or nylon.

13. A hydrocarbon-removing component for a vehicle air intake system of an internal combustion engine, the component comprising:
    a duct having an inner surface and a cross-section, the cross-section being of sufficient size to allow air to flow into the internal combustion engine during operation, wherein the duct is part of an air filter or a resonator; and
    a sheet impregnated with hydrocarbon-removing material;
    wherein the sheet impregnated hydrocarbon-removing material is attached to the inner surface of the duct and removes hydrocarbons when exposed to the air in the vehicle air intake system when the internal combustion engine is not in use.

14. The air intake component of claim 13 wherein the sheet impregnated hydrocarbon-removing material is attached to the inner surface of the duct with an adhesive.

15. The air intake component of claim 13 wherein the sheet impregnated hydrocarbon-removing material is formed into a tube that is slipped into the duct.

16. A method of making a component for removing hydrocarbons from a vehicle air intake system of an internal combustion engine, the method comprising:
    providing a duct having an inner surface and a cross-section, the cross-section being of sufficient size to allow air to flow into the internal combustion engine during operation, wherein the duct is part of an air filter or a resonator; and
    adhering a hydrocarbon-removing material to the duct, wherein the component is useable in the vehicle air intake system to remove hydrocarbons from the air intake system while the internal combustion engine in not in operation.

17. The method of claim 16 wherein the step of adhering a hydrocarbon-removing material comprises
    applying an adhesive to the inner surface of the duct to form a coated inner surface; and
    applying the hydrocarbon-removing material to the coated inner surface.

18. The method of claim 16 wherein the hydrocarbon-removing material is activated carbon or a zeolite.

19. The method of claim 16 wherein the duct is made of plastic, paper, or cardboard.

20. The method of claim 16 wherein the duct is made from a thermoplastic polymer selected from the group consisting of polyolefin-based polymer, a polystyrene-based polymer, a polycabonate polymer, nylon, or mixtures thereof.

21. A method of making a component for removing hydrocarbons from a vehicle air intake system of an internal combustion engine, the method comprising:
    combining fibers, a hydrocarbon-removing material, and a binder together to form a premix;
    pressing the premix together to form a sheet;
    cutting the sheet into a pattern rollable into a duct; and
    rolling the sheet into a duct that is part of an air filter or a resonator.

22. The method of claim 21 wherein the pre-mix is heated during the step of pressing the premix together.

23. The method of claim 21 wherein the hydrocarbon-removing material is activated carbon or a zeolite.

24. The method of claim 21 wherein the fibers are plastic or paper fibers.

25. The method of claim 21 wherein the fibers are thermoplastic fibers selected from the group consisting of polyolefin-based fibers, polystyrene-based fibers, polycabonate fibers, or mixture thereof.

26. The method of claim 21 wherein the fibers are polyethylene fibers, polypropylene fibers, polyester fibers, or nylon fibers.

27. A method of making a component for removing hydrocarbons from a vehicle air intake system of an internal combustion engine, the method comprising:
   providing a duct having an inner surface and a cross-section, the cross-section being of sufficient size to allow air to flow into the internal combustion engine during operation, wherein the duct is part of an filter or a resonator; and
   attaching a sheet impregnated with a hydrocarbon-removing material to the duct, wherein the component is useable in the vehicle air intake system to remove hydrocarbons from the air intake system while the internal combustion engine in not in operation.

28. The method of claim 27 wherein the sheet impregnated with a hydrocarbon-removing material is attached to the duct with an adhesive.

29. A hydrocarbon-removing component for a vehicle air intake system of an internal combustion engine, the component comprising:
   a duct having an inner surface and a cross-section, the cross-section being of sufficient size to allow air to flow into the internal combustion engine during operation, wherein the duct is part of a resonator; and
   a hydrocarbon-removing material; wherein the hydrocarbon-removing material is incorporated into the inner surface of the duct and removes hydrocarbons when exposed to the air in the vehicle air intake system when the internal combustion engine is not in use.

30. The component of claim 29 wherein the hydrocarbon-removing material removes the hydrocarbons in the vehicle air intake system by adsorption, absorption, or by a combination of adsorption and absorption.

31. The component of claim 29 wherein the hydrocarbon-removing material is activated carbon or a zeolite.

32. The component of claim 29 wherein the cross-section is essentially circular with a diameter of 2 to 6 inches.

33. The component of claim 29 wherein the hydrocarbon-removing material is affixed to the inner surface of the duct with an adhesive.

34. The component of claim 29 wherein the hydrocarbon-absorbing material is affixed to the inner surface of the duct with an adhesive.

35. The component of claim 29 wherein the hydrocarbon-removing material is combined with plastic fibers and a binder to form the duct.

36. The component of claim 29 wherein the hydrocbon-absorbing material is combined with plastic fibers and a binder that are used to form the duct.

37. The component of claim 29 wherein the duct formed from plastic, paper or cardboard.

38. The air intake component of claim 29 wherein the duct formed from a thermoplastic polymer.

39. The air intake component of claim 29 wherein the thermoplastic polymer is a polyolefin-based polymer, a polystyrene-based polymer, a polycabonate polymer, or mixture thereof.

40. The air intake component of claim 29 wherein the duct is made from polyethylene, polypropylene or nylon.

* * * * *